Patented Mar. 15, 1949

2,464,488

UNITED STATES PATENT OFFICE 2,464,488

COPOLYMER OF DIALLYL CHLOROMALEATE AND BUTADIENE-1,3

Albert M. Clifford, Stow, and James D. D'Ianni, Akron, Ohio, assignors to Wingfoot Corporation, Akron, Ohio, a corporation of Delaware No Drawing. Application August 25, 1942, Serial No. 456,084

2 Claims. (Cl. 260—78.5)

This invention relates to the copolymers of diesters of monochloromaleic acid which contain at least one unsaturated radical. The esters are formed by refluxing the alcohol or alcohols and monochloromaleic anhydride with a small amount of concentrated sulfuric acid, in a refluxing system containing a water trap. The refluxing is continued until no more water of reaction is produced.

To produce the copolymers of this invention the diesters of monochloromaleic acid, either those containing two unsaturated radicals or mixed esters which contain only one unsaturated radical, are copolymerized in various proportions with one or more of the following monomers, viz., the butadienes, for example, butadiene-1,3, 2-chlorobutadiene-1,2 or 2-cyanobutadiene-1,3, the pentadienes, for example, isoprene; the hexadienes, for example, 2-methylpentadiene-1,3 or 2,3-dimethylbutadiene-1,3; the styrenes, for example, styrene or 2-chlorostyrene-vinyl chloride; and vinyl bromide. The mixed esters which may be used include allyl methyl monochloromaleate, ethyl methallyl monochloromaleate, etc.

The reaction is illustrated by the following example:

Butadiene and the diallyl chloromaleate were copolymerized in a system comprising 65 parts of butadiene to 35 parts of the ester. The ratio of the butadiene to the ester may vary, as for example, from about 20:80 to about 90:10. The following charge was used:

Buffer solution containing .16 g. citric acid,
  .56 g. NaOH, and 1.86 g. 85% H$_3$PO$_4$ cc__ 40
8% sodium lauryl sulfate solution (Duponol) _____ cc__ 40
4N NaOH _____ cc__ 2.0
10% acetaldehyde solution _____ cc__ 2.0
5% NaCN solution _____ cc__ 2.0
NaBO$_3$.4H$_2$O _____ g__ 2.4
Diallyl chloromaleate _____ g__ 22.4
Butadiene-1,3 _____ g__ 41.6

This mixture sealed in a pressure container was tumbled in a water bath at 38° C. for forty hours. It gave a high yield of a factice-like copolymer.

In general, the butadiene copolymers of esters with terminal methylene groups possess lower solubility than the corresponding copolymers of chloromaleates having saturated ester groups.

The solid, emulsion copolymers of this invention, may be mixed with suitable plasticizers and used for molding and coating compositions for fabrics, etc.

What we claim is:

1. A copolymer diallyl chloromaleate and butadiene-1,3 the ratio of the butadiene to the chloromaleate varying from 20:80 to 90:10.

2. An aqueous emulsion copolymer of diallyl chloromaleate and butadiene-1,3 the ratio of the butadiene to the chloromaleate varying from 20:80 to 90:10.

ALBERT M. CLIFFORD.
JAMES D. D'IANNI.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,273,891 | Pollack | Feb. 24, 1942 |
| 2,392,756 | Mighton | Jan. 8, 1946 |

FOREIGN PATENTS

| Number | Country | Date |
|---|---|---|
| 842,186 | France | June 7, 1939 |